United States Patent
Mu

(10) Patent No.: US 12,308,954 B2
(45) Date of Patent: May 20, 2025

(54) COMMUNICATION METHOD, COMMUNICATION APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 363 days.

(21) Appl. No.: 17/799,221

(22) PCT Filed: Feb. 13, 2020

(86) PCT No.: PCT/CN2020/075039
§ 371 (c)(1),
(2) Date: Aug. 11, 2022

(87) PCT Pub. No.: WO2021/159374
PCT Pub. Date: Aug. 19, 2021

(65) Prior Publication Data
US 2023/0075528 A1    Mar. 9, 2023

(51) Int. Cl.
*H04L 1/00* (2006.01)
*H04W 72/1263* (2023.01)

(52) U.S. Cl.
CPC .......... *H04L 1/0003* (2013.01); *H04L 1/0061* (2013.01); *H04W 72/1263* (2013.01)

(58) Field of Classification Search
CPC . H04L 1/0003; H04L 1/0061; H04W 72/1263
See application file for complete search history.

(56) References Cited

U.S. PATENT DOCUMENTS

2015/0215068 A1    7/2015   Wu
2015/0312071 A1   10/2015   Chen et al.
(Continued)

FOREIGN PATENT DOCUMENTS

CN    103944855 A1    7/2014
CN    104202115 A1   12/2014
(Continued)

OTHER PUBLICATIONS

Second CNOA of Application No. 202080000269.3 dated on Nov. 15, 2022 with English translation, (28p).
(Continued)

*Primary Examiner* — Alex Skripnikov
(74) *Attorney, Agent, or Firm* — Arch & Lake LLP

(57) ABSTRACT

The present disclosure relates to a communication method, a communication apparatus, and a storage medium. The communication method comprises: determining a communication mechanism applied to the current communication, the communication mechanism including a first communication mechanism or a second communication mechanism, wherein the first communication mechanism and the second communication mechanism have different configuration parameters, and the maximum modulation order supported by a modulation and coding scheme in the second communication mechanism is higher than the maximum modulation order supported by the modulation and coding scheme in the first communication mechanism; and communicating on the basis of the first communication mechanism or the second communication mechanism.

20 Claims, 4 Drawing Sheets

Determining a communication mechanism used by current communication, the communication mechanism including a first communication mechanism or a second communication mechanism, where the first communication mechanism and the second communication mechanism have different configuration parameters, and a maximum modulation order supported by a MCS in the second communication mechanism is higher than a maximum modulation order supported by a MCS in the first communication mechanism — S11

Performing communication based on the first communication mechanism or the second communication mechanism — S12

(56) References Cited

U.S. PATENT DOCUMENTS

| | | | |
|---|---|---|---|
| 2016/0269218 | A1 | 9/2016 | Zhang et al. |
| 2016/0353440 | A1* | 12/2016 | Lee .................. H04W 72/0453 |
| 2017/0135098 | A1 | 5/2017 | Kang et al. |
| 2017/0366298 | A1 | 12/2017 | Xu et al. |
| 2018/0034679 | A1 | 2/2018 | Zhang et al. |
| 2020/0022141 | A1 | 1/2020 | Kang et al. |
| 2020/0163156 | A1* | 5/2020 | Ye ......................... H04W 88/06 |
| 2020/0204289 | A1* | 6/2020 | Yoshimoto ............ H04L 1/0025 |

FOREIGN PATENT DOCUMENTS

| | | |
|---|---|---|
| CN | 104660544 A1 | 5/2015 |
| CN | 106685587 A1 | 5/2017 |
| CN | 107046453 A | 8/2017 |
| CN | 108463961 A1 | 8/2018 |
| CN | 108551381 A1 | 9/2018 |
| CN | 108964831 A1 | 12/2018 |
| CN | 110463101 A | 11/2019 |
| CN | 110546971 A1 | 12/2019 |
| CN | 110677371 A | 1/2020 |
| EP | 3092761 A1 | 11/2016 |
| WO | 2014110467 A1 | 7/2014 |
| WO | 2014110931 A1 | 7/2014 |
| WO | 2017171956 A1 | 10/2017 |

OTHER PUBLICATIONS

International Search Report of PCT/CN2020/075039 dated Nov. 18, 2020 with English translation, (4p).
Qualcomm Incorporated, "Discussion on modulation enhancements for 256QAM" 3GPP TSG RAN WG1 Meeting #90, R1-1712763, Prague, Czechia, Aug. 21-25, 2017, (6p).
Nokia, "CR to 38.214 capturing the RAN1#92bis and RAN1#93 meeting agreements related to URLLC" 3GPP TSG-RAN1 Meeting #93, R1-1807963, Busan, Korea, May 21-25, 2018, (13p).
Panasonic. "Modulation Order Determination for Downlink Partial Subframes" 3GPP TSG-RAN WG1 Meeting 84, R1-160794, St Julian's, Malta, Feb. 15-19, 2016, (6p).
Broadcom Corporation, "Details of MCS and TBS design for high order modulation" 3GPP TSG-RAN WG1 Meeting #76,R1-140608, Prague, Czech Republic, Feb. 10-14, 2014, (5p).
CN1OA of Issue No. 202080000269.3 dated on Mar. 22, 2022 with English translation, (30p).
CN1OA of Issue No. 2022031702073570 dated on Mar. 22, 2022 with English translation, (30p).

* cited by examiner

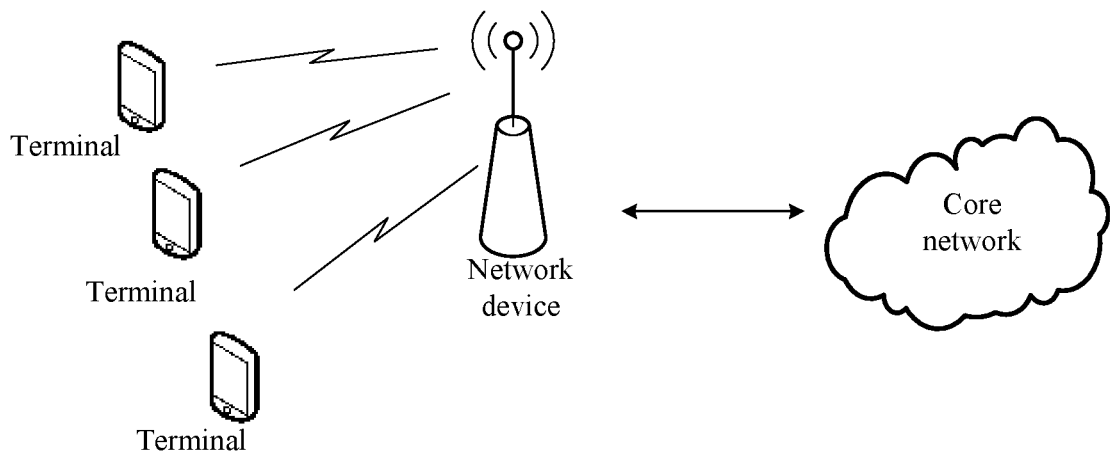

FIG.1

Determining a communication mechanism used by current communication, the communication mechanism including a first communication mechanism or a second communication mechanism, where the first communication mechanism and the second communication mechanism have different configuration parameters, and a maximum modulation order supported by a MCS in the second communication mechanism is higher than a maximum modulation order supported by a MCS in the first communication mechanism — S11

Performing communication based on the first communication mechanism or the second communication mechanism — S12

FIG.2

COMMUNICATION METHOD, COMMUNICATION APPARATUS, AND STORAGE MEDIUM

CROSS-REFERENCE

The present application is a U.S. National Stage of International Application No. PCT/CN2020/075039, filed on Feb. 13, 2020, the contents of which is incorporated herein by reference in its entireties for all purposes.

TECHNICAL FIELD

The present disclosure relates to the field of communication technologies, and in particular, to a communication method, a communication apparatus, and a storage medium.

BACKGROUND

In recent years, Internet of thing (IoT) technologies such as Narrow band Internet of thing (NB-IoT) and Machine Type Communication (MTC) have developed vigorously and have been applied in various fields, which bring great conveniences to human life and work. At present, these technologies have been widely used in smart cities, such as meter reading; smart agriculture, such as collection of information such as temperature and humidity; smart transportation, such as shared bicycles; and many other fields.

Since MTC and NB-IoT are mostly deployed in basements, and device hardware is limited, their coverage is not as good as traditional LTE users. Therefore, repetition transmission is adopted in MTC and NB-IoT to accumulate power, thereby achieving an effect of coverage enhancement. In simple terms, the repetition transmission means transmission of the same transmission content for multiple time units, which time unit may be one subframe or multiple subframes.

For downlink of NB-IoT, only Quadrature Phase Shift Keying (QPSK) modulation mode is supported up to Release 16. In order to further improve a transmission rate of NB-IoT, 16 Quadrature Amplitude Modulation (QAM) modulation mode is further introduced in Release 17 (R17). For a Transport Block Size (TB S) supported by the downlink, the maximum number of TBSs supported is allowed to be expanded. For uplink transmission, it is required that the number of TBSs cannot be increased.

For the downlink of NB-IoT, there is a 4 bit Modulation and Coding Scheme (MCS) field in Downlink Control Information (DCI) for indicating a downlink MCS index (I_MCS). A TBS index (I_TBS) can be determined using a relationship between a MCS index and the TBS index. Typically, in the downlink, I_MCS is equal to I_TBS. Further, a size of a transmitted TBS can be determined using the TBS index and a resource allocation amount allocated.

SUMMARY

The present disclosure provides a communication method, a communication apparatus and a storage medium.

According to a first aspect of embodiments of the present disclosure, there is provided a communication method, which is applied to a terminal, and the communication method includes:
  determining a communication mechanism applied to current communication, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and performing communication according to the first communication mechanism or the second communication mechanism.

According to a second aspect of the embodiments of the present disclosure, there is provided a communication method, which is applied to a network device, and the method includes:
  determining a communication mechanism applied to current communication with a terminal, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and performing communication according to the first communication mechanism or the second communication mechanism.

According to a third aspect of the embodiments of the present disclosure, there is provided a communication apparatus, which is applied to a terminal, and the communication apparatus includes:
  a determination unit, configured to determine a communication mechanism applied to current communication, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and
  a communication unit, configured to perform the communication according to the first communication mechanism or the second communication mechanism.

According to a fourth aspect of the embodiments of the present disclosure, there is provided a communication apparatus, which is applied to a network device, and the communication apparatus includes:
  a determination unit, configured to determine a communication mechanism applied to current communication with a terminal, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and a communication unit, configured to perform communication according to the first communication mechanism or the second communication mechanism.

According to a fifth aspect of the embodiments of the present disclosure, there is provided a communication apparatus, and the communication apparatus includes:
a processor; and a memory configured to store executable instructions of the processor; wherein the processor is configured to execute the communication method described in the first aspect or any implementation of the first aspect.

According to a sixth aspect of the embodiments of the present disclosure, there is provided a communication apparatus, and the communication apparatus includes:
a processor; and a memory configured to store executable instructions of the processor; wherein the processor is configured to execute the communication method described in the second aspect or any implementation of the second aspect.

According to a seventh aspect of the embodiments of the present disclosure, there is provided a non-transitory computer-readable storage medium, wherein instructions in the storage medium, when executed by a processor of a mobile terminal, enable the mobile terminal to execute the communication method described in the first aspect or any implementation of the first aspect.

According to an eighth aspect of the embodiments of the present disclosure, there is provided a non-transitory computer-readable storage medium, wherein instructions in the storage medium, when executed by a processor of a mobile terminal, enable the mobile terminal to execute the communication method described in the second aspect or any implementation of the second aspect.

It should be noted that the above general description and the following detailed description are merely exemplary and explanatory and should not be construed as limiting of the disclosure.

BRIEF DESCRIPTION OF THE DRAWINGS

The accompanying drawings here, which are incorporated in and constitute a part of the disclosure, illustrate embodiments consistent with the present disclosure and, together with the description, serve to explain principles of the present disclosure.

FIG. 1 is a schematic diagram showing a communication system according to an embodiment of the present disclosure.

FIG. 2 is a flowchart showing a communication method according to an embodiment of the present disclosure.

DETAILED DESCRIPTION

Figure 3:
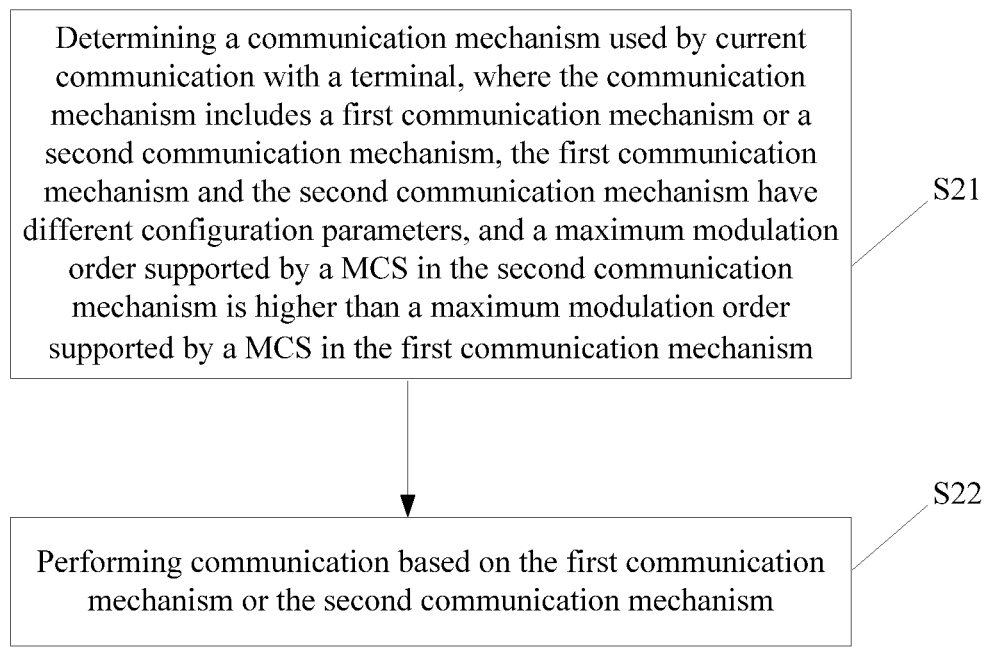
FIG. 3 is a flowchart showing another communication method according to an embodiment of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with some aspects related to the present disclosure as recited in the appended claims.

The present disclosure provides a communication method, and the communication method may be applied to a wireless communication system as illustrated in FIG. 1. As illustrated in FIG. 1, a terminal accesses a network through a network device such as a base station, and the network device completes data backhaul and fronthaul with a core network to perform various communication services.

It may be understood that, the wireless communication system is a network that provides a wireless communication function. The wireless communication system may adopt different communication technologies, for example, Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), Carrier Sense Multiple Access with Collision Avoidance. According to factors such as capacities, rates and latencies of different networks, the network can be divided into a 2 generation (G) network, a 3G network, a 4G network or a future evolution network such as a 5G network which may be also referred to as a New Radio (NR) network. For the convenience of description, in the present disclosure, a wireless communication network is sometimes referred to simply as a network or a system. The network in the present disclosure may include a Radio Access Network (RAN) and a Core Network (CN). The network may include the network device, which may be a wireless access network node, a core network device, etc. The wireless access network node also may be referred to as the base station. The network may provide network services for the terminal through the network device, and different operators may provide different network services for the terminal, and it also may be understood that different operators correspond to different operator networks.

The terminal, also referred to as user equipment (UE), a Mobile Station (MS), a Mobile Terminal (MT), etc., is a device that provides voice and/or data connectivity for a user. For example, the terminal may be a handheld device, a vehicle-mounted device, etc. with a wireless connection function. At present, examples of some terminals may be a mobile phone, a Pocket Personal Computer (PPC), a handheld computer, a Personal Digital Assistant (PDA), a laptop, a tablet, a wearable device, or a vehicle-mounted device.

To support Internet of Things (IOT) services, IoT technologies such as Narrow Band Internet of Things (NB-IOT) and Machine Type Communications (MTC) have been proposed. Repetition transmission is adopted in MTC and NB-IoT to accumulate power, thereby achieving an effect of coverage enhancement.

For downlink of NB-IoT, there is a 4 bit Modulation and Coding Scheme (MCS) field in Downlink Control Information (DCI) for indicating a downlink MCS index (I_MCS). A TBS index (I_TBS) can be determined using a relationship between a MCS index and the TBS index. Typically, in the downlink, I_MCS is equal to I_TBS. Further, a size of a transmitted TBS can be determined using the TBS index and a resource allocation amount allocated. Table 1 shows a TBS table of NB-IoT, where $I_{TBS}$ is a TBS index value, and $I_{SF}$ is a resource allocation amount. The resource allocation amount is described by taking a subframe (SF) as an example, and a resource unit such as a frame or a physical resource block may also be used. Numbers in Table 1 are TBS sizes determined according to the TBS index and the resource allocation amount. For example, when $I_{TBS}$ is 10 and $I_{SF}$ is 2, the corresponding transport block size is 504. In addition, for unicast transmission of NB-IoT, the maximum TBS value that is allowed to be supported is 680.

TABLE 1

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

The TBS table of NB-IoT shown in Table 1 is cut out according to the LTE TBS table. Table 2 shows a portion of the LTE TBS table. The TBS table of NB-IoT basically intercepts a portion of the LTE TBS table in which the number ($N_{PRB}$) of Physical Resource Block (PRB) with TBS of 0-13 is 1, 2, 3, 4, 5, 6, 8, 10.

TABLE 2

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

For the downlink of NB-IoT, only Quadrature Phase Shift Keying (QPSK) modulation mode is supported up to Release 16. In order to further improve a transmission rate of NB-IoT, 16 Quadrature Amplitude Modulation (QAM) modulation mode is further introduced in R17. For a Transport Block Size (TB S) supported by the downlink, the maximum number of TBSs supported is allowed to be expanded. For uplink transmission, it is required that the number of TBSs cannot be increased.

Due to the introduction of higher-order modulation mode, the TBS table will also be expanded. Table 3 below is an example. A TBS index range extends from 0-13 to 0-20.

TABLE 3

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 696 |
| 5 | 72 | 144 | 224 | 328 | 424 | 504 | 680 | 872 |
| 6 | 328 | 176 | 256 | 392 | 504 | 600 | 808 | 1032 |
| 7 | 104 | 224 | 328 | 472 | 584 | 712 | 968 | ~~1288~~ 1352 |
| 8 | 120 | 256 | 392 | 536 | 680 | 808 | 1096 | 1384 |
| 9 | 136 | 296 | 456 | 616 | 776 | 936 | ~~1288~~ 1352 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1000 | ~~1288~~ 1352 | 1544 | 2024 | 2536 |
| 14 | 256 | 552 | 840 | 1128 | 1416 | 1736 | 2280 | 2856 |
| 15 | 280 | 600 | 904 | 1224 | 1544 | 1800 | 2472 | 3112 |
| 16 | 328 | 632 | 968 | ~~1288~~ 1352 | 1608 | 1928 | 2600 | 3240 |

TABLE 3-continued

| | $I_{SF}$ | | | | | | | |
|---|---|---|---|---|---|---|---|---|
| $I_{TBS}$ | 0 | 1 | 2 | 3 | 4 | 5 | 6 | 7 |
| 17 | 336 | 696 | 1064 | 1416 | 1800 | 2152 | 2856 | 3624 |
| 18 | 376 | 776 | 1160 | 1544 | 1992 | 2344 | 3112 | 4008 |
| 19 | 408 | 840 | ~~1288~~ 1352 | 1736 | 2152 | 2600 | 3496 | 4264 |
| 20 | 440 | 904 | 1384 | 1864 | 2344 | 2792 | 3752 | 4584 |

Sometimes, when 16 QAM is introduced, a new communication mechanism is defined. In the new communication mechanism, a new use mechanism of MCS and TBS will be used compared to a use mechanism of MCS and TBS in a communication mechanism before the introduction of 16 QAM.

For the convenience of description, in the embodiments of the present disclosure, the use mechanism of MCS and TBS before the introduction of 16 QAM is called a first communication mechanism, and the use mechanism of MCS and TBS after the introduction of 16 QAM is called a second communication mechanism. The first communication mechanism is different from the second communication mechanism, and a difference between the first communication mechanism and the second communication mechanism may be one or a combination of the following: different MCSs, different TBSs, a mapping relationship between the different MCSs and the different TBSs, and different MCS indication modes. Further, a maximum modulation order supported by the MCS of the second communication mechanism is higher than a maximum modulation order supported by the MCS of the first communication mechanism.

How the terminal and the network device use the second communication mechanism is a technical problem that needs to be solved.

In view of this, the embodiments of the present disclosure provide a communication method, in which the terminal and the network device determine that a communication mechanism applied to current communication is the first communication mechanism or the second communication mechanism, and communicate according to the first communication mechanism or the second communication mechanism.

The technical solutions provided by the embodiments of the present disclosure may include the following beneficial effects: the terminal supports the first communication mechanism and the second communication mechanism, the first communication mechanism and the second communication mechanism have different configuration parameters, and the maximum modulation order supported by the modulation and coding scheme of the second communication mechanism is higher than the maximum modulation order supported by the modulation and coding scheme of the first communication mechanism. By determining that the communication mechanism applied to the current communication of the terminal is the first communication mechanism or the second communication mechanism, it is possible to realize the determination and use of the communication mechanism when a higher-order communication mechanism is introduced.

FIG. 2 is a flowchart showing a communication method according to an embodiment of the present disclosure. Referring to FIG. 2, the communication method is applied to the terminal and includes the following steps S11 to S12.

In the step S11, a communication mechanism applied to current communication is determined.

The communication mechanism applied to the current communication mechanism includes at least the first communication mechanism or the second communication mechanism. The first communication mechanism and the second communication mechanism have different configuration parameters, and the maximum modulation order supported by the MCS of the second communication mechanism is higher than the maximum modulation order supported by the MCS of the first communication mechanism.

In an embodiment of the present disclosure, the configuration parameter includes at least one of the following: a modulation and coding scheme; a transport block size; a mapping between different MCSs and different TBSs; and different MCS indication modes.

In the step S12, communication is performed according to the first communication mechanism or the second communication mechanism.

In the embodiments of the present disclosure, the terminal supports the first communication mechanism and the second communication mechanism, and determines to apply the first communication mechanism or the second communication mechanism to the communication when performing the communication.

In the embodiments of the present disclosure, in order to realize the communication with the terminal, the network device needs to determine whether the communication mechanism applied to the current communication with the terminal is the first communication mechanism or the second communication mechanism, and use the determined communication mechanism to communicate with the terminal.

FIG. 3 is a flowchart showing a communication method according to an embodiment of the present disclosure. Referring to FIG. 3, the communication method is applied to the network device and includes the following steps S21 to S22.

In the step S21, a communication mechanism applied to current communication with a terminal is determined.

The communication mechanism applied to the current communication with the terminal includes at least the first communication mechanism or the second communication mechanism. Note that, in all the embodiments of the present disclosure, a situation of more than two communication mechanisms may be included, which is not limited by the embodiments of the present disclosure. The first communication mechanism and the second communication mechanism have different configuration parameters, and the maximum modulation order supported by the MCS of the second communication mechanism is higher than the maximum modulation order supported by the MCS of the first communication mechanism.

In an embodiment of the present disclosure, the configuration parameter includes at least one of the following: a modulation and coding scheme; a transport block size; a mapping between different MCSs and different TBSs; and different MCS indication modes.

In the step S22, communication is performed according to the first communication mechanism or the second communication mechanism.

In an embodiment of the present disclosure, the network device and the terminal determine whether the communication mechanism applied to the current communication is the first communication mechanism or the second communication mechanism according to a determination mechanism.

The embodiments of the present disclosure are exemplified below to describe an implementation of the terminal and the network device to determine the communication mechanism applied to the current communication.

In an implementation, the use of the second communication mechanism is explicitly indicated through signaling. For example, the use of the second communication mechanism is explicitly configured through higher layer signaling, and the first communication mechanism is applied to default before the configuration through the higher layer signaling is successful. Alternatively, the use of the first communication mechanism is explicitly configured through the higher layer signaling, and the second communication mechanism is applied to default before the configuration through the higher layer signaling is successful. Alternatively, whether the first communication mechanism or the second communication mechanism is used is explicitly configured through the higher layer signaling, and before the configuration through the higher layer signaling is successful, the terminal determines to use the first communication mechanism or the second communication mechanism by its own, and reports it to the network device.

In an embodiment of the present disclosure, signaling indicating the use of the second communication mechanism is referred to as first signaling. If the terminal receives the first signaling, it determines to apply the second communication mechanism to the communication, and if the terminal does not receive the first signaling, it determines to apply the first communication mechanism to the communication. For the network device, if it is determined that the second communication mechanism is used for communication, the first signaling is sent to the terminal, and if it is determined that the first communication mechanism is applied to the communication, the first signaling is not sent to the terminal.

It should be understood that the above embodiment is just an example for illustration, and other implementations can also be used.

For example, in the embodiments of the present disclosure, the signaling indicating the use of the first communication mechanism is referred to as the first signaling. If the terminal receives the first signaling, it determines to apply the first communication mechanism to the communication, and if the terminal does not receive the first signaling, it determines to apply the second communication mechanism to the communication. For the network device, if it is determined that the first communication mechanism is used for communication, the first signaling is sent to the terminal, and if it is determined that the second communication mechanism is applied to the communication, the first signaling is not sent to the terminal.

For another example, in the embodiments of the present disclosure, the signaling indicating the use of the first communication mechanism is referred to as the first signaling, and the signaling indicating the use of the second communication mechanism is referred to as second signaling. If the terminal receives the first signaling, it determines to apply the first communication mechanism to the communication, and if the terminal receives the second signaling, it determines to apply the second communication mechanism to the communication. For the network device, if it is determined to apply the first communication mechanism to the communication, the first signaling is sent to the terminal, and if it is determined to apply the second communication mechanism to the communication, the second signaling is sent to the terminal.

In another implementation, it is determined according to DCI that the communication mechanism applied to the current communication is the first communication mechanism or the second communication mechanism.

In the embodiments of the present disclosure, the network device may dynamically notify the terminal of the communication mechanism applied to the current communication through the DCI, for example, the first communication mechanism or the second communication mechanism.

On the one hand, the embodiments of the present disclosure can use an information field in the DCI for explicit notification. The information field may be a newly added information field, or other existing information fields may be multiplexed to be used as the information field. For example, a DCI repetition transmission field or a data repetition transmission indication field is multiplexed. It is a manner that the use of the second communication mechanism is indicated by the information field included in the DCI. For the network device or the terminal, if the DCI includes an information field for indicating the second communication mechanism, it is determined to apply the second communication mechanism to the communication, and if the DCI does not include the information field for indicating the second communication mechanism, it is determined to apply the first communication mechanism to the communication. Note that, the above embodiment is just an example for illustration, and other implementations can also be used. For the network device or the terminal, if the DCI includes an information field for indicating the first communication mechanism, it is determined to apply the first communication mechanism to the communication, and if the DCI does not include the information field for indicating the first communication mechanism, it is determined to apply the second communication mechanism to the communication. Alternatively, if the DCI includes the information field for indicating the first communication mechanism, it is determined to apply the first communication mechanism to the communication, and if the DCI includes the information field for indicating the second communication mechanism, it is determined to apply the second communication mechanism to the communication.

On the other hand, the embodiments of the present disclosure may use different Cell Radio Network Temporary Identifiers (C-RNTIs) for indication. For example, when the first communication mechanism is used, a first C-RNTI is used to scramble the Cyclic Redundancy Check (CRC) of the DCI, and when the second communication mechanism is used, a second C-RNTI is used to scramble the CRC of the DCI. For the network device or the terminal, if the CRC of the DCI is scrambled by the first C-RNTI, it is determined to apply the first communication mechanism to the communication, and if the CRC of the DCI is scrambled by the second C-RNTI, it is determined to apply the second communication mechanism to the communication.

On still another hand, the embodiments of the present disclosure determine the communication mechanism applied to the current communication according to a correspondence between a coverage enhancement level and a communication mechanism. In an implementation, a correspondence between the coverage enhancement level and the second communication mechanism is preset in the embodiments of the present disclosure. For example, a mapping relationship between the coverage enhancement level and the use of the second communication mechanism may be defined in a protocol or configured in broadcast signaling. For the network device or the terminal, it is determined whether to use the second communication mechanism according to the coverage enhancement level. If a current coverage enhancement level has a correspondence with the second communication mechanism, it is determined to apply the second communication mechanism to the communication, and if the current coverage enhancement level does not have the correspondence with the second communication mechanism, the second communication mechanism is not used for communication. In an embodiment of the present disclosure, if the current coverage enhancement level does not have the correspondence with the second communication mechanism, the first communication mechanism may be used, or other communication mechanisms are used, or a combination of other communication mechanisms is used.

For example, a correspondence between a Physical Random Access Channel (PRACH) coverage enhancement level 0 and the second communication mechanism is preset. Accordingly, when it is the PRACH coverage enhancement level 0, the second communication mechanism is applied to default. For other coverage enhancement levels other than the PRACH coverage enhancement level 0, the second communication mechanism is not used. In an embodiment of the present disclosure, for other coverage enhancement levels other than the PRACH coverage enhancement level 0, the first communication mechanism may be used, or other communication mechanisms are used, or a combination of other communication mechanisms is used.

On still another hand, the embodiments of the present disclosure determine the communication mechanism applied to the current communication according to the maximum number of repetition transmissions configured by the network device. The maximum number of repetition transmissions may be the maximum number of repetition transmissions of a control channel, or may be the maximum number of repetition transmissions of a data channel. In the embodiments of the present disclosure, when the communication mechanism applied to the current communication is determined according to the maximum number of repetition transmissions configured by the network device, a threshold for the number of repetition transmissions may be set. For example, when the configured maximum number of repetition transmissions is less than the threshold for the number of repetition transmissions, the second communication mechanism is applied to default, and when the configured maximum number of repetition transmissions is greater than the threshold for the number of repetition transmissions, the second communication mechanism is not used. In an embodiment of the present disclosure, when the configured maximum number of repetition transmissions is greater than the threshold for the number of repetition transmissions, the first communication mechanism may be used, or other communication mechanisms are used, or a combination of other communication mechanisms is used.

In the embodiments of the present disclosure, the terminal and the network device adopt the above-mentioned manner for determining the communication mechanism, so that the terminal and the network device can determine a consistent communication mechanism for the communication mechanism applied to the current communication.

In the embodiments of the present disclosure, the second communication mechanism can be used for the communication between the terminal and the network device, the terminal needs to support the second communication mechanism, and the network device determines that the terminal supports the second communication mechanism.

In an implementation, the terminal supporting the second communication mechanism may report capability information indicating that the terminal supports the second communication mechanism to the network device. If the network device receives the capability information reported by the terminal, it determines that the terminal supports the second communication mechanism. The terminal may report the capability information indicating that the terminal supports the second communication mechanism to the network device through the higher layer signaling, and the network device receives the capability information reported by the terminal according to the higher layer signaling. If the higher layer signaling for indicating that the terminal supports the second communication mechanism is received, it is determined that the terminal supports the second communication mechanism, and if the higher layer signaling for indicating that the terminal supports the second communication mechanism is not received, it is determined that the terminal does not support the second communication mechanism.

In another implementation, the network device allocates a specific random access resource for the second communication mechanism, and the terminal supporting the second communication mechanism performs random access on the specific random access resource, which implicitly notifies the network device that the terminal supports the second communication mechanism. For the convenience of description, in the embodiments of the present disclosure, the random access resource allocated by the network device for the terminal that is dedicated for the random access by the terminal supporting the second communication mechanism is referred to as a first random access resource. If the terminal performs the random access according to the first random access resource, it is determined that the terminal supports the second communication mechanism, and if the terminal performs the random access according to a random access resource other than the first random access resource, it is determined that the terminal does not support the second communication mechanism.

In still another implementation, the network device allocates the specific random access resource for the terminal that supports the second communication mechanism and meets to apply the second communication mechanism to the communication. The terminal that supports the second communication mechanism performs the random access on the specific random access resource, which implicitly notifies the network device that the terminal supports the second communication mechanism, and notifies the network device that the terminal meets a condition for using the second communication mechanism to the communication (for example, a channel quality is higher than a specified channel quality).

In the embodiments of the present disclosure, the random access resource allocated by the network device for the terminal that is dedicated for the random access by the terminal that supports the second communication mechanism and meets to apply the second communication mechanism to the communication is referred to as a second random access resource. If the terminal performs the random access according to the second random access resource, it is determined that the terminal supports the second communication mechanism and meets the condition for using the second communication mechanism to the communication. If the terminal performs the random access according to a random access resource other than the second random access resource, it is determined that the terminal does not support the second communication mechanism and/or does not meet the condition for using the second communication mechanism to the communication.

In the embodiments of the present disclosure, the communication performed by the terminal and the network device may be uplink communication or downlink communication. Communication mechanisms applied to the uplink communication and the downlink communication may be the same or different. Further, when the terminal and the network device perform the uplink communication or the downlink communication, manners for determining the used communication mechanism may be the same or different. In the embodiments of the present disclosure, the manner for determining the used communication mechanism may be understood as various implementations in which the communication mechanism is determined as the first communication mechanism or the second communication mechanism in the above-mentioned embodiments, and may also be understood as a method for configuring the terminal to use the second communication mechanism.

In an example, it is assumed that the terminal has a capability of using 16 QAM, that is, supports the second communication mechanism, but the terminal is limited by the influence of channel conditions, etc., and does not necessarily apply the second communication mechanism to the communication. For example, the uplink communication uses the first communication mechanism to the communication, and the downlink communication uses the second communication mechanism to the communication. In another example, the uplink communication determines whether to use the second communication mechanism according to the higher layer signaling configuration manner, and the downlink communication determines whether to use the second communication mechanism according to the maximum number of repetition transmissions of the control channel.

It can be understood that the manner for determining the communication mechanism applied to the current communication in the communication method involved in the above-mentioned embodiments of the present disclosure may be applicable to a communication process performed by the terminal, a communication process performed by the network device, or a communication process in which the terminal interacts with the network device.

According to the same concept, the embodiments of the present disclosure further provide a communication apparatus.

It can be understood that, in order to implement the above-mentioned functions, the communication apparatus provided by the embodiments of the present disclosure includes corresponding hardware structures and/or software modules for executing respective functions. In combination with units and algorithm steps of various examples disclosed in the embodiments of the present disclosure, the embodiments of the present disclosure may be implemented by in a form of hardware or a combination of the hardware and computer software. Whether a certain function is implemented in the fashion of hardware or in a fashion that the computer software drives the hardware depends on particular applications and design constraints of the technical solution. A person skilled in the art may implement the described functions with different methods for each of particular applications, but such an implementation shall not be regarded as going beyond the scope of the technical solution according to the embodiments of the present disclosure.

Figure 4:
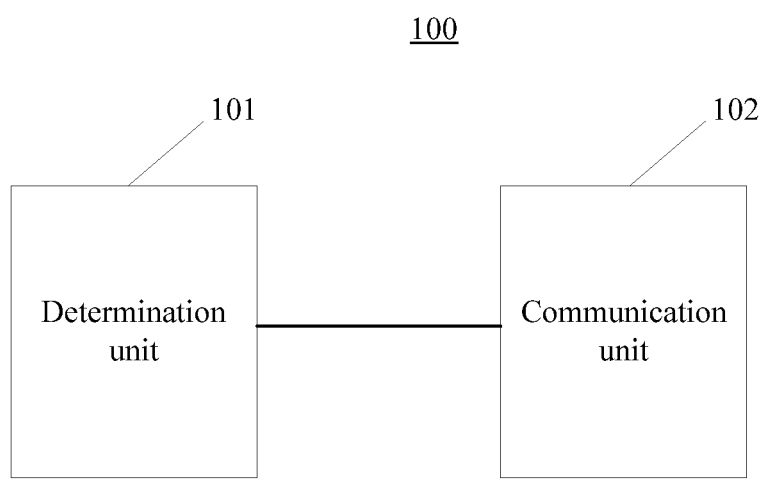
FIG. 4 is a block diagram showing a communication apparatus according to an embodiment of the present disclosure.

FIG. 4 is a block diagram showing a communication apparatus according to an embodiment of the present disclosure. Referring to FIG. 4, a communication apparatus 100 is applied to a terminal and includes a determination unit 101 and a communication unit 102.

The determination unit 101 is configured to determine a communication mechanism applied to current communication, the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism. The communication unit 102 is configured to perform the communication according to the first communication mechanism or the second communication mechanism.

In an implementation, the configuration parameter includes at least one of the following:
a modulation and coding scheme; a transport block size; a mapping between different modulation and coding schemes and different transport block sizes; and different modulation and coding scheme indication modes.

In another implementation, the determining, by the determination unit 101, the communication mechanism applied to the current communication in the following manner:
if first signaling for indicating to apply the second communication mechanism to the communication is received by the communication unit 102, determining to apply the second communication mechanism to the communication; and if the first signaling for indicating to apply the second communication mechanism to the communication is not received by the communication unit 102, determining to apply the first communication mechanism to the communication.

In yet another implementation, the determining, by the determination unit 101, the communication mechanism applied to the current communication in the following manner: determining the communication mechanism applied to the current communication according to downlink control signaling.

In yet another implementation, the determining, by the determination unit 101, the communication mechanism applied to the current communication according to the downlink control signaling in the following manner:
if the downlink control signaling includes an information field for indicating the second communication mechanism, determining to apply the second communication mechanism to the communication; and if the downlink control signaling does not include the information field for indicating the second communication mechanism, determining to apply the first communication mechanism to the communication.

In yet another implementation, the determining, by the determination unit 101, the communication mechanism applied to the current communication according to the downlink control signaling in the following manner:
if a cyclic redundancy check (CRC) of the downlink control signaling is scrambled with a first cell-radio network temporary identifier (C-RNTI), determining to apply the first communication mechanism to the communication; and if the cyclic redundancy check (CRC) of the downlink control signaling is scrambled with a second cell-radio network temporary identifier (C-RNTI), determining to apply the second communication mechanism to the communication.

In yet another implementation, the determining, by the determination unit 101, the communication mechanism applied to the current communication in the following manner: determining the communication mechanism applied to the current communication according to a correspondence between a coverage enhancement level and the communication mechanism.

In yet another implementation, the determining, by the determination unit, the communication mechanism applied to the current communication according to the correspondence between the coverage enhancement level and the communication mechanism in the following manner:

if a current coverage enhancement level has a correspondence with the second communication mechanism, determining to apply the second communication mechanism to the communication; and if the current coverage enhancement level does not have the correspondence with the second communication mechanism, determining to apply the first communication mechanism to the communication.

In yet another implementation, the determining, by the determination unit 101, the communication mechanism applied to the current communication in the following manner:

determining the communication mechanism applied to the current communication according to a maximum number of repetition transmissions configured by a network device.

In yet another implementation, the maximum number of repetition transmissions includes a maximum number of repetition transmissions of a control channel or a maximum number of repetition transmissions of a data channel.

In yet another implementation, the communication unit 102 involved in the embodiments of the present disclosure is further configured to report capability information, and the capability information is used to indicate that the second communication mechanism is supported by the terminal.

In yet another implementation, the communication unit 102 is configured to report the capability information in the following manner:

reporting the capability information according to higher layer signaling, and the capability information is used to indicate that the terminal has a capability of supporting the second communication mechanism.

In yet another implementation, the communication unit 102 is configured to report the capability information in the following manner:

performing random access according to a first random access resource, and the first random access resource is dedicated to performing the random access by the terminal supporting the second communication mechanism.

In yet another implementation, the communication unit 102 is configured to report the capability information in the following manner:

performing random access according to a second random access resource, and the second random access resource is dedicated to performing the random access by the terminal supporting the second communication mechanism and meeting to apply the second communication mechanism to the communication.

In yet another implementation, the communication includes uplink communication or downlink communication; and communication mechanisms applied to the uplink communication and the downlink communication are the same or different.

In yet another implementation, a manner for determining the communication mechanism applied to the uplink communication is different from a manner for determining the communication mechanism applied to the downlink communication.

Regarding the apparatus in the above-mentioned embodiments, a specific manner in which each module performs operations has been described in detail in the relevant method embodiments, and will not be described in detail here.

Figure 5:
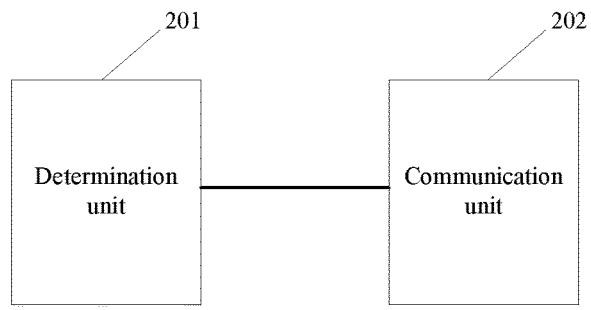
FIG. 5 is a block diagram showing another communication apparatus according to an embodiment of the present disclosure.

FIG. 5 is a block diagram showing a communication apparatus according to an embodiment of the present disclosure. Referring to FIG. 5, a communication apparatus 200 is applied to the network device and includes a determination unit 201 and a communication unit 202.

The determination unit 201 is configured to determine a communication mechanism applied to current communication with a terminal, and the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism. The communication unit 202 is configured to perform communication according to the first communication mechanism or the second communication mechanism.

In an implementation, the configuration parameter includes at least one of the following:

a modulation and coding scheme; a transport block size; a mapping between different modulation and coding schemes and different transport block sizes; and different modulation and coding scheme indication modes.

In another implementation, the determination unit 201 is configured to determine the communication mechanism applied to the current communication with the terminal in the following manner:

if first signaling for indicating to apply the second communication mechanism to the communication is sent by the communication unit 202 to the terminal, determining that the second communication mechanism is applied to the current communication with the terminal for communication; and if the first signaling for indicating to apply the second communication mechanism to the communication is not sent by the communication unit 202 to the terminal, determining that the first communication mechanism is applied to the current communication with the terminal for communication.

In yet another implementation, the determination unit 201 is configured to determine the communication mechanism applied to the current communication with the terminal in the following manner:

determining the communication mechanism applied to the current communication with the terminal according to downlink control signaling.

In yet another implementation, the determination unit is configured to determine the communication mechanism applied to the current communication with the terminal according to the downlink control signaling in the following manner:

if the downlink control signaling includes an information field for indicating the second communication mechanism, determining that the second communication mechanism is applied to the current communication with the terminal for communication; and if the downlink control signaling does not include the information field for indicating the second communication mechanism, determining that the first communication mechanism is applied to the current communication with the terminal for communication.

In yet another implementation, the determination unit 201 is configured to determine the communication mechanism applied to the current communication with the terminal according to the downlink control signaling in the following manner:

if a cyclic redundancy check (CRC) of the downlink control signaling is scrambled with a first cell-radio network temporary identifier (C-RNTI), determining that the first communication mechanism is applied to the current communication with the terminal for communication; and if the cyclic redundancy check (CRC) of the downlink control signaling is scrambled with a second cell-radio network temporary identifier (C-RNTI), determining that the second communication mechanism is applied to the current communication with the terminal for communication.

In yet another implementation, the determination unit 201 is configured to determine the communication mechanism applied to the current communication with the terminal in the following manner:

determining the communication mechanism applied to the current communication with the terminal according to a correspondence between a coverage enhancement level and the communication mechanism.

In yet another implementation, the determination unit 201 is configured to determine the communication mechanism applied to the current communication with the terminal according to the correspondence between the coverage enhancement level and the communication mechanism in the following manner:

if a current coverage enhancement level has a correspondence with the second communication mechanism, determining that the second communication mechanism is applied to the current communication with the terminal for communication; and if the current coverage enhancement level does not have the correspondence with the second communication mechanism, determining that the first communication mechanism is applied to the current communication with the terminal for communication.

In yet another implementation, the determination unit 201 is configured to determine the communication mechanism applied to the current communication with the terminal in the following manner including:

determining the communication mechanism applied to the current communication with the terminal according to a maximum number of repetition transmissions.

In yet another implementation, the maximum number of repetition transmissions includes a maximum number of repetition transmissions of a control channel or a maximum number of repetition transmissions of a data channel.

In yet another implementation, the determination unit 201 in the embodiments of the present disclosure is further configured to determine that the second communication mechanism is supported by the terminal.

In yet another implementation, the determination unit 201 is configured to determine that the second communication mechanism is supported by the terminal in the following manner:

if higher layer signaling for indicating that the second communication mechanism is supported by the terminal is received by the communication unit 202, determining that the second communication mechanism is supported by the terminal.

In yet another implementation, the determination unit 201 is configured to determine that the second communication mechanism is supported by the terminal in the following manner:

if random access is performed by the terminal according to a first random access resource, determining that the second communication mechanism is supported by the terminal, and the first random access resource is dedicated to performing the random access by the terminal supporting the second communication mechanism.

In yet another implementation, the determination unit 201 is configured to determine that the second communication mechanism is supported by the terminal in the following manner:

if random access is performed by the terminal according to a second random access resource, determining that the second communication mechanism is supported by the terminal, and the second random access resource is dedicated to performing the random access by the terminal supporting the second communication mechanism and meeting to apply the second communication mechanism to the communication.

In yet another implementation, the communication includes uplink communication or downlink communication; and communication mechanisms applied to the uplink communication and the downlink communication are the same or different.

In yet another implementation, a manner for determining the communication mechanism applied to the uplink communication is different from a manner for determining the communication mechanism applied to the downlink communication.

Regarding the apparatus in the above-mentioned embodiments, a specific manner in which each module performs operations has been described in detail in the relevant method embodiments, and will not be described in detail here.

Figure 6:
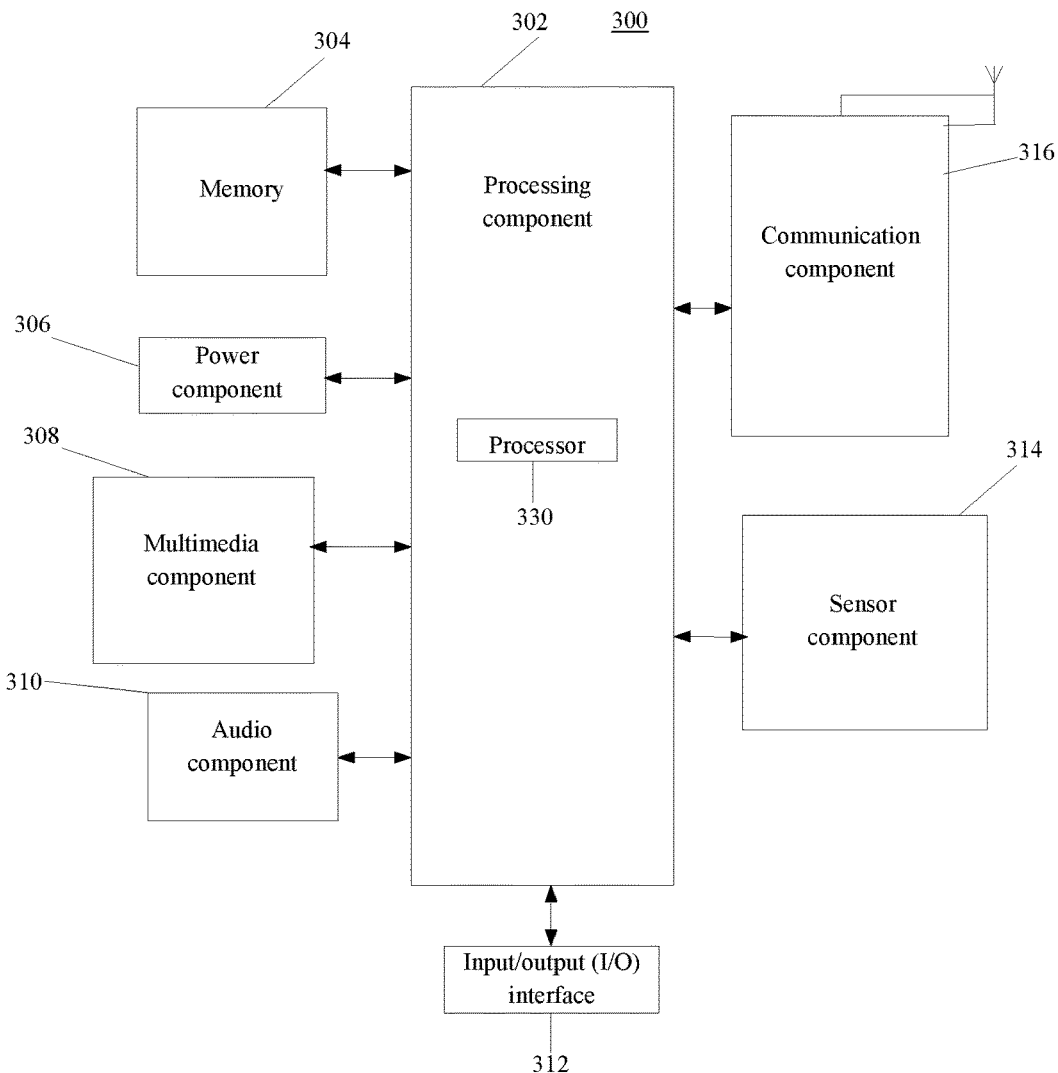
FIG. 6 is a block diagram showing a device for communication according to an embodiment of the present disclosure.

FIG. 6 is a block diagram showing a device 300 for communication according to an embodiment of the present disclosure. For example, the device 300 can be a mobile phone, a computer, a digital broadcast terminal, a messaging apparatus, a gaming console, a tablet, a medical apparatus, exercise equipment, a personal digital assistant, etc.

Referring to FIG. 6, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 330 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other apparatus. The device 300 may access a wireless network according to a communication standard, such as WiFi, 2G, or 3G, or a combination thereof. In one embodiment, the communication component 316 receives a broadcast signal or broadcast associated information from an external broadcast management system via a broadcast channel. In one embodiment, the communication component 316 further includes a near field communication (NFC) module to facilitate short-range communications. For example, the NFC module may be implemented according to a radio frequency identification (RFID) technology, an infrared data association (IrDA) technology, an ultra-wideband (UWB) technology, a Bluetooth (BT) technology, and other technologies.

In an embodiment, the device 300 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In an embodiment, there is also provided a non-transitory computer-readable storage medium including instructions, such as the memory 304 including instructions, the above instructions may be executed by the processor 330 in the device 300 for performing the above-described methods. For example, the non-transitory computer-readable storage medium may be a ROM, a Random Access Memory (RAM), a CD-ROM, a magnetic tape, a floppy disc, an optical data storage device, and the like.

Figure 7:
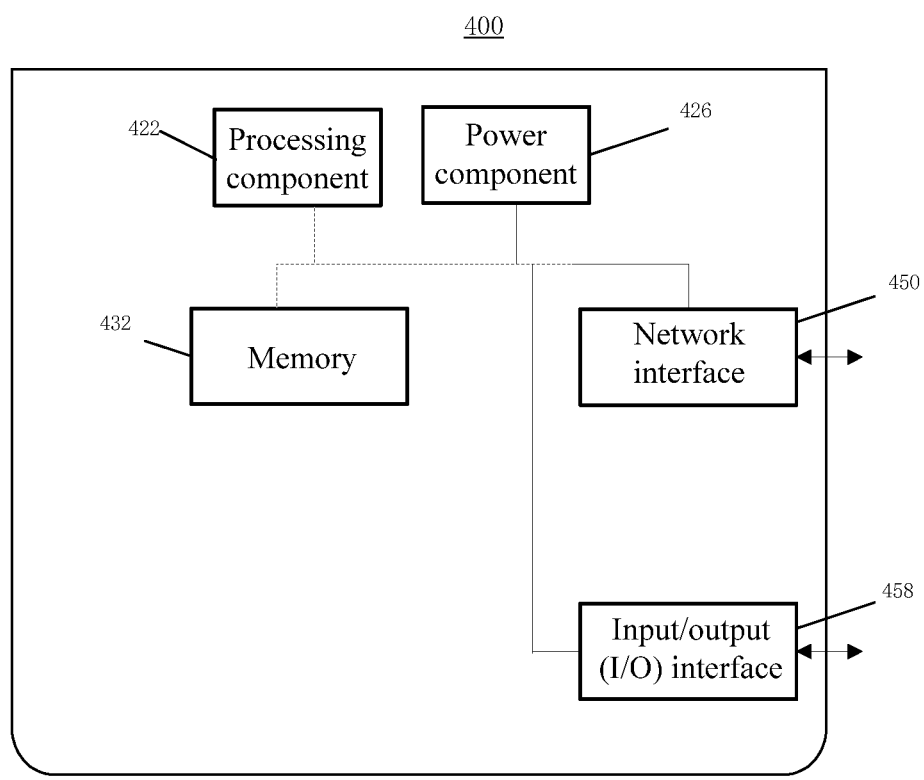
FIG. 7 is a block diagram showing another device for communication according to an embodiment of the present disclosure.

FIG. 7 is a block diagram showing a device 400 for communication according to an embodiment of the present disclosure. The device 400 can be the network device. Referring to FIG. 7, the device 400 includes a processing component 422, which further includes one or more processors and a memory resource represented by a memory 432 for storing instructions executable by the processing component 422, such as an application program. The application program stored in the memory 432 may include one or more modules, each corresponding to a set of instructions. In addition, the processing component 422 is configured to execute the instructions to execute the aforementioned methods.

The device 400 may also include: a power component 426 configured to perform power management of the device 400, a wired or wireless network interface 450 configured to connect the device 400 to the network, and an input/output (I/O) interface 458. The device 400 may operate an operating system stored in the memory 432, such as Windows Server™, Mac OS X™, Unix™, Linux™, FreeBSD™, or the like.

In an embodiment of the present disclosure, there is also provided a non-transitory computer-readable storage medium including instructions, such as the memory 404 including instructions, the above instructions may be executed by the processor 420 in the device 400 for performing the above-described methods. For example, the non-transitory computer-readable storage medium may be a ROM, a Random Access Memory (RAM), a CD-ROM, a magnetic tape, a floppy disc, an optical data storage device, and the like.

the present disclosure provides a communication method, a communication apparatus and a storage medium.

According to a first aspect of embodiments of the present disclosure, there is provided a communication method, which is applied to a terminal, and the communication method includes:

determining a communication mechanism applied to current communication, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and performing communication according to the first communication mechanism or the second communication mechanism.

In an implementation, the configuration parameter includes at least one of the following:
  a modulation and coding scheme; a transport block size; a mapping between different modulation and coding schemes and different transport block sizes; and different modulation and coding scheme indication modes.

In another implementation, the determining the communication mechanism applied to the current communication includes:
  if first signaling for indicating to apply the second communication mechanism to the communication is received, determining to apply the second communication mechanism to the communication; and if the first signaling for indicating to apply the second communication mechanism to the communication is not received, determining to apply the first communication mechanism to the communication.

In yet another implementation, the determining the communication mechanism applied to the current communication includes: determining the communication mechanism applied to the current communication according to downlink control signaling.

In yet another implementation, the determining the communication mechanism applied to the current communication according to the downlink control signaling includes:
  if the downlink control signaling includes an information field for indicating the second communication mechanism, determining to apply the second communication mechanism to the communication; and if the downlink control signaling does not include the information field for indicating the second communication mechanism, determining to apply the first communication mechanism to the communication.

In yet another implementation, the determining the communication mechanism applied to the current communication according to the downlink control signaling includes:
  if a cyclic redundancy check (CRC) of the downlink control signaling is scrambled with a first cell-radio network temporary identifier (C-RNTI), determining to apply the first communication mechanism to the communication; and if the cyclic redundancy check (CRC) of the downlink control signaling is scrambled with a second cell-radio network temporary identifier (C-RNTI), determining to apply the second communication mechanism to the communication.

In yet another implementation, the determining the communication mechanism applied to the current communication includes: determining the communication mechanism applied to the current communication according to a correspondence between a coverage enhancement level and the communication mechanism.

In yet another implementation, the determining the communication mechanism applied to the current communication according to the correspondence between the coverage enhancement level and the communication mechanism includes:
  if a current coverage enhancement level has a correspondence with the second communication mechanism, determining to apply the second communication mechanism to the communication; and if the current coverage enhancement level does not have the correspondence with the second communication mechanism, determining to apply the first communication mechanism to the communication.

In yet another implementation, the determining the communication mechanism applied to the current communication includes:
  determining the communication mechanism applied to the current communication according to a maximum number of repetition transmissions configured by a network device.

In yet another implementation, the maximum number of repetition transmissions includes a maximum number of repetition transmissions of a control channel or a maximum number of repetition transmissions of a data channel.

In yet another implementation, the communication method involved in the embodiments of the present disclosure further includes reporting capability information, wherein the capability information is used to indicate that the second communication mechanism is supported by the terminal.

In yet another implementation, the reporting the capability information includes:
  reporting the capability information according to higher layer signaling, wherein the capability information is used to indicate that the terminal has a capability of supporting the second communication mechanism.

In yet another implementation, the reporting the capability information includes:
  performing random access according to a first random access resource, wherein the first random access resource is dedicated to performing the random access by the terminal supporting the second communication mechanism.

In yet another implementation, the reporting the capability information includes:
  performing random access according to a second random access resource, wherein the second random access resource is dedicated to performing the random access by the terminal supporting the second communication mechanism and meeting to apply the second communication mechanism to the communication.

In yet another implementation, the communication includes uplink communication or downlink communication; and
  communication mechanisms applied to the uplink communication and the downlink communication are the same or different.

In yet another implementation, a manner for determining the communication mechanism applied to the uplink communication is different from a manner for determining the communication mechanism applied to the downlink communication.

According to a second aspect of the embodiments of the present disclosure, there is provided a communication method, which is applied to a network device, and the method includes:
  determining a communication mechanism applied to current communication with a terminal, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and performing communication according to the first communication mechanism or the second communication mechanism.

In an implementation, the configuration parameter includes at least one of the following:
a modulation and coding scheme; a transport block size; a mapping between different modulation and coding schemes and different transport block sizes; and different modulation and coding scheme indication modes.

In another implementation, the determining the communication mechanism applied to the current communication of the terminal includes:
if first signaling for indicating to apply the second communication mechanism to the communication is sent to the terminal, determining that the second communication mechanism is applied to the current communication with the terminal for communication; and if the first signaling for indicating to apply the second communication mechanism to the communication is not sent to the terminal, determining that the first communication mechanism is applied to the current communication with the terminal for communication.

In yet another implementation, the determining the communication mechanism applied to the current communication of the terminal includes:
determining the communication mechanism applied to the current communication of the terminal according to downlink control signaling.

In yet another implementation, the determining the communication mechanism applied to the current communication of the terminal according to the downlink control signaling includes:
if the downlink control signaling includes an information field for indicating the second communication mechanism, determining that the second communication mechanism is applied to the current communication with the terminal for communication; and if the downlink control signaling does not include the information field for indicating the second communication mechanism, determining that the first communication mechanism is applied to the current communication with the terminal for communication.

In yet another implementation, the determining the communication mechanism applied to the current communication of the terminal according to the downlink control signaling includes:
if a cyclic redundancy check (CRC) of the downlink control signaling is scrambled with a first cell-radio network temporary identifier (C-RNTI), determining that the first communication mechanism is applied to the current communication with the terminal for communication; and if the cyclic redundancy check (CRC) of the downlink control signaling is scrambled with a second cell-radio network temporary identifier (C-RNTI), determining that the second communication mechanism is applied to the current communication with the terminal for communication.

In yet another implementation, the determining the communication mechanism applied to the current communication of the terminal includes:
determining the communication mechanism applied to the current communication of the terminal according to a correspondence between a coverage enhancement level and the communication mechanism.

In yet another implementation, the determining the communication mechanism applied to the current communication of the terminal according to the correspondence between the coverage enhancement level and the communication mechanism includes:
if a current coverage enhancement level has a correspondence with the second communication mechanism, determining that the second communication mechanism is applied to the current communication with the terminal for communication; and if the current coverage enhancement level does not have the correspondence with the second communication mechanism, determining that the first communication mechanism is applied to the current communication with the terminal for communication.

In yet another implementation, the determining the communication mechanism applied to the current communication of the terminal includes:
determining the communication mechanism applied to the current communication of the terminal according to a maximum number of repetition transmissions.

In yet another implementation, the maximum number of repetition transmissions includes a maximum number of repetition transmissions of a control channel or a maximum number of repetition transmissions of a data channel.

In yet another implementation, the communication method involved in the embodiments of the present disclosure further includes:
determining that the second communication mechanism is supported by the terminal.

In yet another implementation, the determining that the second communication mechanism is supported by the terminal includes:
if higher layer signaling for indicating that the second communication mechanism is supported by the terminal is received, determining that the second communication mechanism is supported by the terminal.

In yet another implementation, the determining that the second communication mechanism is supported by the terminal includes:
if random access is performed by the terminal according to a first random access resource, determining that the second communication mechanism is supported by the terminal, wherein the first random access resource is dedicated to performing the random access by the terminal supporting the second communication mechanism.

In yet another implementation, the determining that the second communication mechanism is supported by the terminal includes:
if random access is performed by the terminal according to a second random access resource, determining that the second communication mechanism is supported by the terminal, wherein the second random access resource is dedicated to performing the random access by the terminal supporting the second communication mechanism and meeting to apply the second communication mechanism to the communication.

In yet another implementation, the communication includes uplink communication or downlink communication; and communication mechanisms applied to the uplink communication and the downlink communication are the same or different.

In yet another implementation, a manner for determining the communication mechanism applied to the uplink communication is different from a manner for determining the communication mechanism applied to the downlink communication.

According to a third aspect of the embodiments of the present disclosure, there is provided a communication apparatus, which is applied to a terminal, and the communication apparatus includes:
 a determination unit, configured to determine a communication mechanism applied to current communication, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and
 a communication unit, configured to perform the communication according to the first communication mechanism or the second communication mechanism.

In an implementation, the configuration parameter includes at least one of the following:
 a modulation and coding scheme; a transport block size; a mapping between different modulation and coding schemes and different transport block sizes; and different modulation and coding scheme indication modes.

In another implementation, the determining, by the determination unit, the communication mechanism applied to the current communication in the following manner:
 if first signaling for indicating to apply the second communication mechanism to the communication is received by the communication unit, determining to apply the second communication mechanism to the communication; and if the first signaling for indicating to apply the second communication mechanism to the communication is not received by the communication unit, determining to apply the first communication mechanism to the communication.

In yet another implementation, the determining, by the determination unit, the communication mechanism applied to the current communication in the following manner: determining the communication mechanism applied to the current communication according to downlink control signaling.

In yet another implementation, the determining, by the determination unit, the communication mechanism applied to the current communication according to the downlink control signaling in the following manner:
 if the downlink control signaling includes an information field for indicating the second communication mechanism, determining to apply the second communication mechanism to the communication; and if the downlink control signaling does not include the information field for indicating the second communication mechanism, determining to apply the first communication mechanism to the communication.

In yet another implementation, the determining, by the determination unit, the communication mechanism applied to the current communication according to the downlink control signaling in the following manner:
 if a cyclic redundancy check (CRC) of the downlink control signaling is scrambled with a first cell-radio network temporary identifier (C-RNTI), determining to apply the first communication mechanism to the communication; and if the cyclic redundancy check (CRC) of the downlink control signaling is scrambled with a second cell-radio network temporary identifier (C-RNTI), determining to apply the second communication mechanism to the communication.

In yet another implementation, the determining, by the determination unit, the communication mechanism applied to the current communication in the following manner: determining the communication mechanism applied to the current communication according to a correspondence between a coverage enhancement level and the communication mechanism.

In yet another implementation, the determining, by the determination unit, the communication mechanism applied to the current communication according to the correspondence between the coverage enhancement level and the communication mechanism in the following manner:
 if a current coverage enhancement level has a correspondence with the second communication mechanism, determining to apply the second communication mechanism to the communication; and if the current coverage enhancement level does not have the correspondence with the second communication mechanism, determining to apply the first communication mechanism to the communication.

In yet another implementation, the determining, by the determination unit, the communication mechanism applied to the current communication in the following manner:
 determining the communication mechanism applied to the current communication according to a maximum number of repetition transmissions configured by a network device.

In yet another implementation, the maximum number of repetition transmissions includes a maximum number of repetition transmissions of a control channel or a maximum number of repetition transmissions of a data channel.

In yet another implementation, the communication unit involved in the embodiments of the present disclosure is further configured to report capability information, wherein the capability information is used to indicate that the second communication mechanism is supported by the terminal.

In yet another implementation, the communication unit is configured to report the capability information in the following manner:
 reporting the capability information according to higher layer signaling, wherein the capability information is used to indicate that the terminal has a capability of supporting the second communication mechanism.

In yet another implementation, the communication unit is configured to report the capability information in the following manner:
 performing random access according to a first random access resource, wherein the first random access resource is dedicated to performing the random access by the terminal supporting the second communication mechanism.

In yet another implementation, the communication unit is configured to report the capability information in the following manner:
 performing random access according to a second random access resource, wherein the second random access resource is dedicated to performing the random access by the terminal supporting the second communication mechanism and meeting to apply the second communication mechanism to the communication.

In yet another implementation, the communication includes uplink communication or downlink communication; and communication mechanisms applied to the uplink communication and the downlink communication are the same or different.

In yet another implementation, a manner for determining the communication mechanism applied to the uplink communication is different from a manner for determining the communication mechanism applied to the downlink communication.

According to a fourth aspect of the embodiments of the present disclosure, there is provided a communication apparatus, which is applied to a network device, and the communication apparatus includes:

a determination unit, configured to determine a communication mechanism applied to current communication with a terminal, wherein the communication mechanism includes a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and a communication unit, configured to perform communication according to the first communication mechanism or the second communication mechanism.

In an implementation, the configuration parameter includes at least one of the following:

a modulation and coding scheme; a transport block size; a mapping between different modulation and coding schemes and different transport block sizes; and different modulation and coding scheme indication modes.

In another implementation, the determination unit is configured to determine the communication mechanism applied to the current communication with the terminal in the following manner:

if first signaling for indicating to apply the second communication mechanism to the communication is sent by the communication unit to the terminal, determining that the second communication mechanism is applied to the current communication with the terminal for communication; and if the first signaling for indicating to apply the second communication mechanism to the communication is not sent by the communication unit to the terminal, determining that the first communication mechanism is applied to the current communication with the terminal for communication.

In yet another implementation, the determination unit is configured to determine the communication mechanism applied to the current communication with the terminal in the following manner:

determining the communication mechanism applied to the current communication with the terminal according to downlink control signaling.

In yet another implementation, the determination unit is configured to determine the communication mechanism applied to the current communication with the terminal according to the downlink control signaling in the following manner:

if the downlink control signaling includes an information field for indicating the second communication mechanism, determining that the second communication mechanism is applied to the current communication with the terminal for communication; and if the downlink control signaling does not include the information field for indicating the second communication mechanism, determining that the first communication mechanism is applied to the current communication with the terminal for communication.

In yet another implementation, the determination unit is configured to determine the communication mechanism applied to the current communication with the terminal according to the downlink control signaling in the following manner:

if a cyclic redundancy check (CRC) of the downlink control signaling is scrambled with a first cell-radio network temporary identifier (C-RNTI), determining that the first communication mechanism is applied to the current communication with the terminal for communication; and if the cyclic redundancy check (CRC) of the downlink control signaling is scrambled with a second cell-radio network temporary identifier (C-RNTI), determining that the second communication mechanism is applied to the current communication with the terminal for communication.

In yet another implementation, the determination unit is configured to determine the communication mechanism applied to the current communication with the terminal in the following manner:

determining the communication mechanism applied to the current communication with the terminal according to a correspondence between a coverage enhancement level and the communication mechanism.

In yet another implementation, the determination unit is configured to determine the communication mechanism applied to the current communication with the terminal according to the correspondence between the coverage enhancement level and the communication mechanism in the following manner:

if a current coverage enhancement level has a correspondence with the second communication mechanism, determining that the second communication mechanism is applied to the current communication with the terminal for communication; and if the current coverage enhancement level does not have the correspondence with the second communication mechanism, determining that the first communication mechanism is applied to the current communication with the terminal for communication.

In yet another implementation, the determination unit is configured to determine the communication mechanism applied to the current communication with the terminal in the following manner including:

determining the communication mechanism applied to the current communication with the terminal according to a maximum number of repetition transmissions.

In yet another implementation, the maximum number of repetition transmissions includes a maximum number of repetition transmissions of a control channel or a maximum number of repetition transmissions of a data channel.

In yet another implementation, the determination unit in the embodiments of the present disclosure is further configured to determine that the second communication mechanism is supported by the terminal.

In yet another implementation, the determination unit is configured to determine that the second communication mechanism is supported by the terminal in the following manner:

if higher layer signaling for indicating that the second communication mechanism is supported by the terminal is received by the communication unit, determining that the second communication mechanism is supported by the terminal.

In yet another implementation, the determination unit is configured to determine that the second communication mechanism is supported by the terminal in the following manner:

if random access is performed by the terminal according to a first random access resource, determining that the second communication mechanism is supported by the terminal, wherein the first random access resource is dedicated to performing the random access by the terminal supporting the second communication mechanism.

In yet another implementation, the determination unit is configured to determine that the second communication mechanism is supported by the terminal in the following manner:

if random access is performed by the terminal according to a second random access resource, determining that the second communication mechanism is supported by the terminal, wherein the second random access resource is dedicated to performing the random access by the terminal supporting the second communication mechanism and meeting to apply the second communication mechanism to the communication.

In yet another implementation, the communication includes uplink communication or downlink communication; and communication mechanisms applied to the uplink communication and the downlink communication are the same or different.

In yet another implementation, a manner for determining the communication mechanism applied to the uplink communication is different from a manner for determining the communication mechanism applied to the downlink communication.

According to a fifth aspect of the embodiments of the present disclosure, there is provided a communication apparatus, and the communication apparatus includes:

a processor; and a memory configured to store executable instructions of the processor; wherein the processor is configured to execute the communication method described in the first aspect or any implementation of the first aspect.

According to a sixth aspect of the embodiments of the present disclosure, there is provided a communication apparatus, and the communication apparatus includes:

a processor; and a memory configured to store executable instructions of the processor; wherein the processor is configured to execute the communication method described in the second aspect or any implementation of the second aspect.

According to a seventh aspect of the embodiments of the present disclosure, there is provided a non-transitory computer-readable storage medium, wherein instructions in the storage medium, when executed by a processor of a mobile terminal, enable the mobile terminal to execute the communication method described in the first aspect or any implementation of the first aspect.

According to an eighth aspect of the embodiments of the present disclosure, there is provided a non-transitory computer-readable storage medium, wherein instructions in the storage medium, when executed by a processor of a mobile terminal, enable the mobile terminal to execute the communication method described in the second aspect or any implementation of the second aspect.

It may be further understood that, "a plurality of" or "multiple" in the present disclosure refers to two or more than two, which is similar to other quantifiers. "And/or" describes an association relationship of the associated objects, and represents that there may be three relationships, for example, A and/or B, may represent: A exists alone, both A and B exist, and B exists alone. The character "/" generally represents an "or" relationship of the associated objects. The singular forms "an", "said" and "the" are also intended to include a plural form, unless the context clearly indicates otherwise.

It may be further understood that, although the terms "first", "second", etc. may be used to describe various information, such information should not be limited to these terms. These terms are only used to distinguish the same type of information from each other, and do not imply a particular order or level of importance. In fact, the expressions "first", "second", etc. are used completely interchangeably. For example, without departing from the scope of the present disclosure, the first information may also be referred to as the second information, and similarly, the second information may also be referred to as the first information.

It may be further understood that although the operations in the embodiments of the present disclosure are described in a specific order in the drawings, they should not be understood as requiring that the operations are performed in the specific order shown or in a serial order, or that all the operations shown are performed to get the desired result. In certain environments, multitasking and parallel processing may be advantageous.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure.

It should be understood that the present disclosure is not limited to the precise structures that have been described above and shown in the drawings, and various modifications and changes can be made without departing from the scope thereof.

What is claimed is:

1. A communication method, performed by a terminal, comprising:

determining a communication mechanism applied to communication, wherein the communication mechanism comprises a first communication mechanism or a second communication mechanism, and wherein a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and performing communication according to the first communication mechanism or the second communication mechanism;

wherein determining the communication mechanism applied to the communication comprises:

determining the communication mechanism applied to the communication according to a correspondence between a coverage enhancement level and the communication mechanism; and wherein determining the communication mechanism applied to the communication according to the correspondence between the coverage enhancement level and the communication mechanism comprises:

when a current coverage enhancement level has a correspondence with the second communication mechanism, determining to apply the second communication mechanism to the communication; and when the current coverage enhancement level does not have the correspondence with the second communication mechanism, determining to apply the first communication mechanism to the communication.

2. The communication method according to claim 1, wherein the configuration parameter comprises at least one of the following:
a modulation and coding scheme;
a transport block size;
a mapping between the modulation and coding schemes and the transport block sizes; and
a modulation and coding scheme indication mode.

3. The communication method according to claim 1, wherein determining the communication mechanism applied to the communication further comprises at least one of:

when first signaling for indicating to apply the second communication mechanism to the communication is received, determining to apply the second communication mechanism to the communication;

when the first signaling for indicating to apply the second communication mechanism to the communication is not received, determining to apply the first communication mechanism to the communication;

when a downlink control signaling comprises an information field for indicating the second communication mechanism, determining to apply the second communication mechanism to the communication;

when the downlink control signaling does not comprise the information field for indicating the second communication mechanism, determining to apply the first communication mechanism to the communication;

when a cyclic redundancy check (CRC) of the downlink control signaling is scrambled with a first cell-radio network temporary identifier (C-RNTI), determining to apply the first communication mechanism to the communication;

when the cyclic redundancy check (CRC) of the downlink control signaling is scrambled with a second cell-radio network temporary identifier (C-RNTI), determining to apply the second communication mechanism to the communication; and determining the communication mechanism applied to the communication according to a maximum number of repetition transmissions configured by a network device, wherein the maximum number of repetition transmissions comprises a maximum number of repetition transmissions of a control channel or a maximum number of repetition transmissions of a data channel.

4. The communication method according to claim 1, wherein the method further comprises:
reporting capability information, wherein the capability information is configured to indicate that the second communication mechanism is supported by the terminal.

5. The communication method according to claim 4, wherein the reporting the capability information comprises:
reporting the capability information according to higher layer signaling.

6. The communication method according to claim 4, wherein the reporting the capability information comprises:
performing random access according to a first random access resource, wherein the first random access resource is dedicated for the terminal supporting the second communication mechanism to performing the random access.

7. The communication method according to claim 4, wherein the reporting the capability information comprises:
performing random access according to a second random access resource, wherein the second random access resource is dedicated for the terminal supporting the second communication mechanism and meeting a condition to apply the second communication mechanism to the communication to performing the random access.

8. The communication method according to claim 1, wherein the communication mechanism is in a Narrow band Internet of thing (NB-IoT) communication, the first communication mechanism supports a Quadrature Phase Shift Keying (QPSK) modulation mode, and the second communication mechanism supports at least a 16 Quadrature Amplitude Modulation (QAM) modulation mode.

9. The communication method according to claim 1, wherein the communication comprises uplink communication or downlink communication; and
communication mechanisms applied to the uplink communication and the downlink communication are the same or different.

10. The communication method according to claim 9, wherein a manner for determining a communication mechanism applied to the uplink communication is different from a manner for determining a communication mechanism applied to the downlink communication.

11. A communication method, performed by a network device, comprising:
determining a communication mechanism applied to communication with a terminal, wherein the communication mechanism comprises a first communication mechanism or a second communication mechanism, a configuration parameter of the first communication mechanism is different from a configuration parameter of the second communication mechanism, and a maximum modulation order supported by a modulation and coding scheme of the second communication mechanism is higher than a maximum modulation order supported by a modulation and coding scheme of the first communication mechanism; and performing communication according to the first communication mechanism or the second communication mechanism;

wherein determining the communication mechanism applied to the communication comprises:
determining the communication mechanism applied to the communication according to a correspondence between a coverage enhancement level and the communication mechanism; and wherein determining the communication mechanism applied to the communication according to the correspondence between the coverage enhancement level and the communication mechanism comprises:

when a current coverage enhancement level has a correspondence with the second communication mechanism, determining to apply the second communication mechanism to the communication; and when the current coverage enhancement level does not have the correspondence with the second communication mechanism, determining to apply the first communication mechanism to the communication.

12. The communication method according to claim 11, wherein the configuration parameter comprises at least one of the following:
   a modulation and coding scheme;
   a transport block size;
   a mapping between the modulation and coding schemes and the transport block sizes; and
   a modulation and coding scheme indication mode.

13. The communication method according to claim 11, wherein determining the communication mechanism applied to the communication with the terminal further comprises at least one of:
   when first signaling for indicating to apply the second communication mechanism to the communication is sent to the terminal, determining that the second communication mechanism is applied to the communication with the terminal;
   when the first signaling for indicating to apply the second communication mechanism to the communication is not sent to the terminal, determining that the first communication mechanism is applied to the communication with the terminal;
   when a downlink control signaling comprises an information field for indicating the second communication mechanism, determining to apply the second communication mechanism to the communication;
   when the downlink control signaling does not comprise the information field for indicating the second communication mechanism, determining to apply the first communication mechanism to the communication;
   when a cyclic redundancy check (CRC) of the downlink control signaling is scrambled with a first cell-radio network temporary identifier (C-RNTI), determining to apply the first communication mechanism to the communication;
   when the cyclic redundancy check (CRC) of the downlink control signaling is scrambled with a second cell-radio network temporary identifier (C-RNTI), determining to apply the second communication mechanism to the communication; and
   determining the communication mechanism applied to the communication according to a maximum number of repetition transmissions configured by a network device, wherein the maximum number of repetition transmissions comprises a maximum number of repetition transmissions of a control channel or a maximum number of repetition transmissions of a data channel.

14. The communication method according to claim 11, wherein the communication mechanism is in a Narrow band Internet of thing (NB-IoT) communication, the first communication mechanism supports a Quadrature Phase Shift Keying (QPSK) modulation mode, and the second communication mechanism supports at least a 16 Quadrature Amplitude Modulation (QAM) modulation mode.

15. The communication method according to claim 11, wherein the method further comprises:
   determining that the second communication mechanism is supported by the terminal.

16. The communication method according to claim 15, wherein the determining that the second communication mechanism is supported by the terminal comprises:
   when higher layer signaling for indicating that the second communication mechanism is supported by the terminal is received, determining that the second communication mechanism is supported by the terminal.

17. The communication method according to claim 15, wherein the determining that the second communication mechanism is supported by the terminal comprises:
   when random access is performed by the terminal according to a first random access resource, determining that the second communication mechanism is supported by the terminal, wherein the first random access resource is dedicated to for the terminal supporting the second communication mechanism to performing the random access.

18. The communication method according to claim 15, wherein the determining that the second communication mechanism is supported by the terminal comprises:
   when random access is performed by the terminal according to a second random access resource, determining that the second communication mechanism is supported by the terminal, wherein the second random access resource is dedicated for the terminal supporting the second communication mechanism and meeting a condition to apply the second communication mechanism to the communication to performing the random access.

19. The communication method according to claim 11, wherein the communication comprises uplink communication or downlink communication; and
   communication mechanisms applied to the uplink communication and the downlink communication are the same or different.

20. The communication method according to claim 19, wherein a manner for determining a communication mechanism applied to the uplink communication is different from a manner for determining a communication mechanism applied to the downlink communication.

* * * * *